Aug. 9, 1955 C. GLOVER 2,714,780
POISON BAIT CONTAINER FOR RODENTS
Filed Dec. 23, 1952 2 Sheets-Sheet 1
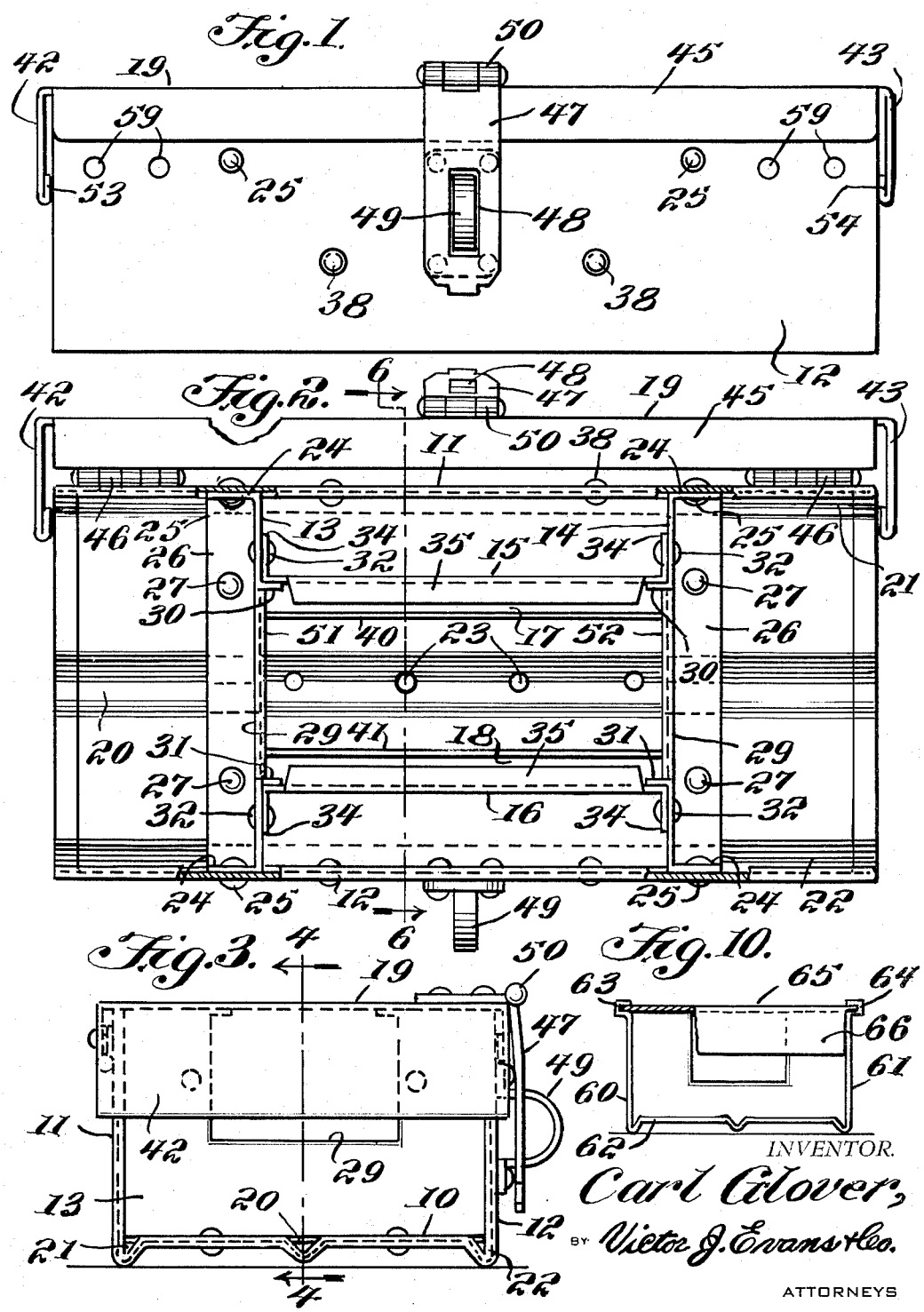

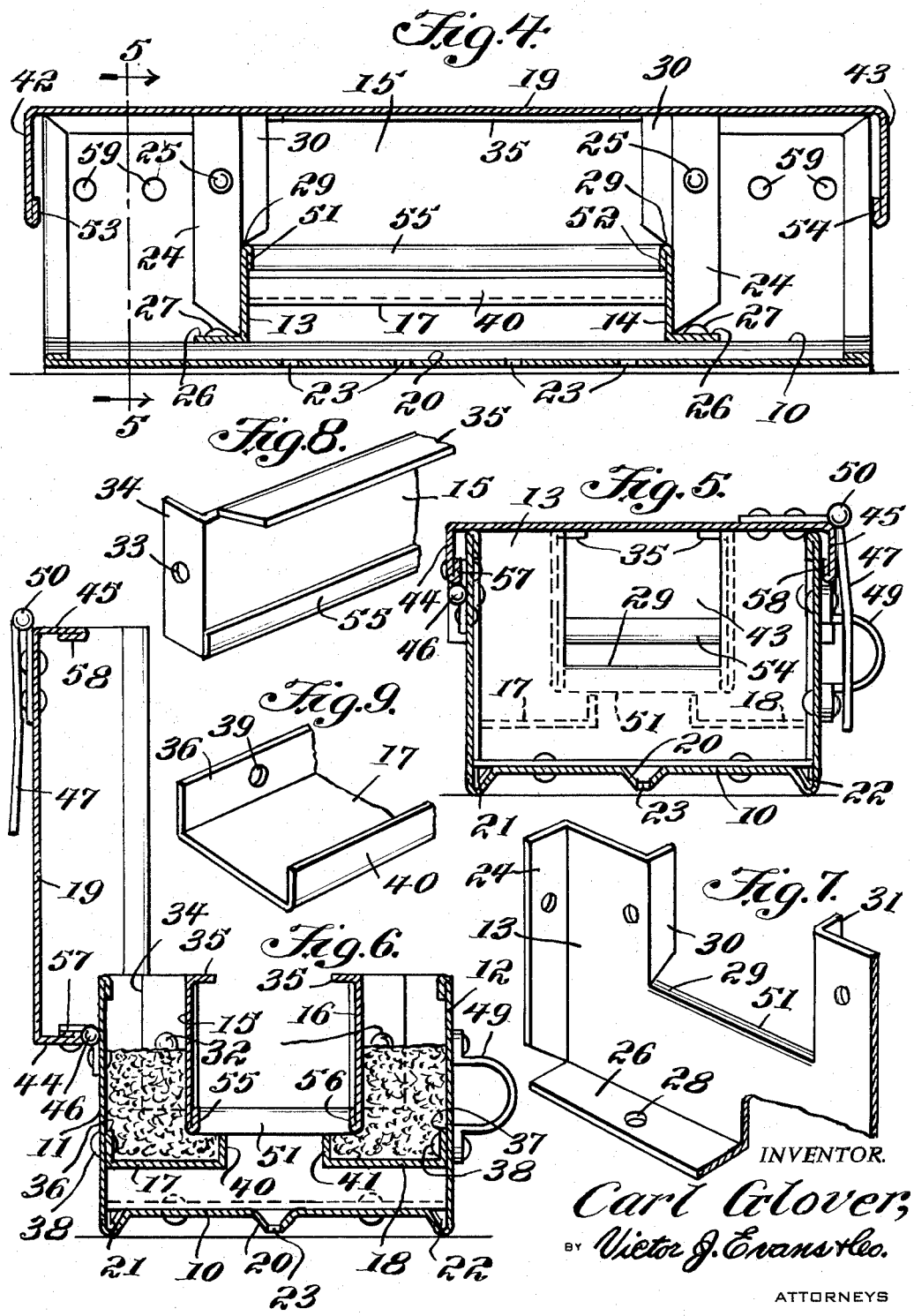

United States Patent Office 2,714,780
Patented Aug. 9, 1955

2,714,780

POISON BAIT CONTAINER FOR RODENTS

Carl Glover, Preston, Idaho

Application December 23, 1952, Serial No. 327,480

3 Claims. (Cl. 43—131)

This invention relates to containers and other devices for holding poison bait for destroying rodents such as rats and mice, and in particular a box-like holder in which bait, such as grain treated with poison is provided and wherein the poison grain is hidden from animals other than animals entering the holder and is protected from dirt, dust and the like dropping from animals feeding on the bait whereby the treated grain exposed to the rodent is clean continuously.

The purpose of this invention is to provide a container for poison bait whereby the bait is enclosed in a housing and is only exposed to animals entering the housing.

The use of poison grain is limited because it is difficult to prevent animals for which the bait is not intended eating the bait and also because the poison bait is soon covered with dirt dropping from the bodies of rodents passing through the housing in which the bait is positioned. With this thought in mind this invention contemplates a dispenser or feeder for holding poison bait, such as grain treated with poison whereby the bait is contained in troughs spaced above the floor of a housing and also spaced from the ends of the housing and in which the housing is provided with a cover on the upper portion and drain channels in the lower portion whereby refuse and urine of animals passing through the housing is readily drained therefrom.

The object of this invention is, therefore, to provide a holder for poison bait in which the bait is not exposed to animals other than those for which the bait is intended, and also in which the bait is protected from dirt, dust and the like dropping from animals feeding on the bait.

Another object of the invention is to provide a poison bait holder that is adapted to be readily cleaned and refilled without disturbing bait therein.

A further object of the invention is to provide a poison bait feeder and holder which is of a simple and economical construction.

With these and other objects and advantages in view the invention embodies a box-like housing having bins therein with the bins spaced from the ends and also from the base of the housing and also having a hinged cover that is adapted to be secured in the closed position.

Other features and advantages of the invention will appear from the following description taken in connection with the drawings, wherein:

Figure 1 is a side elevational view illustrating the improved poison bait holder, showing the holder with the cover in the closed position and looking toward the front on which a latch for securing the cover closed is positioned.

Figure 2 is a plan view of the poison bait holder showing the cover in the open position.

Figure 3 is an end elevational view of the poison bait holder with the cover closed, as shown in Fig. 1.

Figure 4 is a longitudinal section through the poison bait holder taken on line 4—4 of Fig. 3.

Figure 5 is a cross section through the holder taken on line 5—5 of Fig. 4, the cover being shown in the closed position.

Figure 6 is also a cross section through the housing taken on line 6—6 of Fig. 2 and showing the cover in the open position.

Figure 7 is a detail illustrating one of the transversely disposed partitions forming the ends of the bait bins of the holder, part of said partition being broken away.

Figure 8 is a detail showing one of the inner side walls of the bins of the holder which wall extends between the partitions illustrated in Fig. 7.

Figure 9 is a detail showing a panel forming the bottom of one of the bait bins which panel extends between the said transversely disposed partitions.

Figure 10 is an end elevational view of the container with part broken away, showing a modification wherein the cover is slidably mounted in grooves in the container.

Referring now to the drawings wherein like reference characters denote corresponding parts, the improved poison bait holder of this invention includes a housing having a base 10 with upwardly extending side walls 11 and 12, transversely disposed partitions 13 and 14, spaced inner walls 15 and 16, panels 17 and 18 forming the bottoms of the bait holding bins, and a cover 19.

The base 10 is provided with a longitudinally disposed central V-shaped drain channel 20 with similar channels 21 and 22 at the sides whereby urine and other liquids dropping from animals drain to the side channels of the housing or pass through openings 23 in the central channel, and the side walls 11 and 12, which extend upwardly from the side edges of the base are supported in upright positions by the transversely disposed partitions 13 and 14.

The ends of the partitions 13 and 14 are provided with flanges 24 by which the partitions are secured to the side walls 11 and 12 with rivets 25 and the lower edges of the partitions are provided with flanges 26 that are secured to the base 10 with rivets 27 extended through openings 28 in the flanges.

The partitions 13 and 14 are provided with openings 29, and flanges or ears 30 and 31 extended inwardly from the edges of the openings provide reinforcing means for the inner walls 15 and 16, the ends of which walls are secured to the partitions by rivets 32 that extend through openings 33 in flanges 34 at the ends thereof. The upper edges of the inner walls 15 and 16 are provided with flanges 35 which are positioned to engage the inner surface of the cover 19.

The panels 17 and 18 are provided with flanges 36 and 37 by which the outer edges of the panels are secured to the side walls 11 and 12 with rivets 38 that extend through openings 39 in the flanges. The opposite or inner edges of the panels 17 and 18 are provided with lips or tongues 40 and 41 that provide the inner walls of the troughs, as shown in Fig. 6.

The cover 19 is provided with a continuous flange having end sections 42 and 43 and side sections 44 and 45 and the cover is hinged to the wall 11 of the housing by hinges 46 which are secured to the wall 11 and to the section 44 of the depending flange of the cover.

The cover 19 is also provided with a hasp 47 that is provided with a slot 48 that extends over an eye 49 on the front wall 12 of the housing, the hasp being hinged to the cover with a hinge 50.

As illustrated in Fig. 4 the inner edges at the lower sides of the openings 29 in the partitions 13 and 14 are folded over as shown at the points 51 and 52 to eliminate sharp edges and the edges of the flanges 42 and 43 of the cover 19 are also folded over as shown at the points 53 and 54, for the same reason. The lower edges of the inner side walls 15 and 16 are folded at the points 55 and 56 to reinforce the lower edges of the walls.

The lower edges of the front and rear flanges 44 and 45 of the cover 19 are also folded over to reinforce the flanges as shown at the points 57 and 58.

The housing may also be provided with ventilating openings, as indicated by the numerals 59 and these openings may be located at suitable points in the walls of the housing.

With the parts arranged in this manner a mouse or rat enters the container from either end, crawling over the partitions 13 or 14 and eats grain from the troughs formed between the lips 40 and 41 and the inner walls 15 and 16 as illustrated in Fig. 6. With the cover in the closed position, grain, or the like, which has been treated with poison is protected from dirt, dust, and the like dropping from animals passing through the housing. Urine or other liquids are drained off by the channels 20, 21 and 22 whereby the housing is maintained in a comparatively clean condition.

In the modification illustrated in Figure 10, side walls 60 and 61, of a housing 62 are provided with grooves 63 and 64 in which the edges of a cover 65 are positioned providing a sliding cover. The cover is provided with a flange 66 which extends from one end thereof.

The bait may be poisoned grain, meat, cheese, or the like, or the bait may be formed of dough or the like.

It will be understood that modifications, within the scope of the appended claims, may be made in the design and arrangement of the parts without departing from the spirit of the invention.

What is claimed is:

1. In a poison bait container, the combination which comprises an elongated box-like housing having a base with upwardly extended side walls, the ends of said housing being open, transversely disposed partitions spaced from the ends of the housing, extended across the housing and having openings in the intermediate parts thereof with the openings extending from points substantially midway of the height of the housing to the upper portion, spaced inner walls extended between the partitions providing a central channel, panels with upwardly extended lips on the inner edges spaced from the base of the housing and positioned below said inner walls whereby areas between the lips and inner walls provide feed troughs, said panels extending to the side walls of the housing providing feed hoppers between the side walls and inner walls, and a cover positioned to cover the upper ends of the feed hoppers of the housing.

2. In a poison bait container, the combination which comprises an elongated box-like housing having a base with upwardly extended side walls, the ends of said housing being open, transversely disposed partitions spaced from the ends of the housing, extended across the housing and having openings in the intermediate parts thereof with the openings extending from points substantially midway of the height of the housing to the upper portion, spaced inner walls extended between the partitions providing a central channel, panels with upwardly extended lips on the inner edges spaced from the base of the housing and positioned below said inner walls whereby areas between the lips and inner walls provide feed troughs, said panels extending to the side walls providing feed hoppers between the side walls and inner walls, and a cover positioned to cover the upper ends of the feed hoppers of the housing, and said base having longitudinally disposed drain channels therein.

3. In a poison bait container, a housing provided with a horizontally disposed base, a pair of spaced parallel vertically disposed side walls extending upwardly from the longitudinal side edges of said base, a pair of spaced parallel vertically disposed partitions extending transversely with respect to said side walls and base, said partitions being spaced inwardly from the ends of said base, said base being provided with a longitudinally extending V-shaped drainage channel intermediate its side edges, there being a longitudinally extending channel at each side of said base, the bottom of said side channels extending below said base to provide a support, the ends of said partitions being provided with flanges secured to said side walls and base, said partitions being provided with registering openings, ears extending inwardly from said partitions adjacent said openings, a pair of spaced parallel vertically disposed inner walls positioned in said housing and extending between said partitions, flanges on the upper edges of said inner walls, a cover mounted on the top of said housing and engaging said wall flanges, a pair of panels positioned in said housing and extending between said partitions and secured to said side walls, each of said panels including an inner tongue defining an inner wall of a trough, the bottom of said panels being spaced below the bottom of said inner walls, said troughs adapted to hold poison bait, the mouse or rat gaining access to the poison bait by crawling through the ends of the housing and through the openings of said partitions.

References Cited in the file of this patent

UNITED STATES PATENTS

| 461,302 | Wright | Oct. 13, 1891 |
| 712,516 | Frost et al. | Nov. 4, 1902 |
| 801,198 | Adriance | Oct. 10, 1905 |
| 886,934 | Bradford | May 5, 1908 |
| 1,176,243 | Price | Mar. 21, 1916 |
| 2,359,341 | Weil | Oct. 3, 1944 |
| 2,683,326 | Gardner | July 13, 1954 |

FOREIGN PATENTS

| 481,043 | Germany | Aug. 13, 1929 |
| 981,172 | France | Jan. 10, 1951 |